(12) United States Patent
Udagawa et al.

(10) Patent No.: US 7,137,631 B2
(45) Date of Patent: Nov. 21, 2006

(54) CYLINDER HEAD GASKET

(75) Inventors: Tsunekazu Udagawa, Ichikawa (JP); Yuuichi Kinoshita, Tochigi-ken (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 66 days.

(21) Appl. No.: 11/017,004

(22) Filed: Dec. 21, 2004

(65) Prior Publication Data
US 2005/0151327 A1 Jul. 14, 2005

(30) Foreign Application Priority Data
Jan. 9, 2004 (JP) ............................. 2004-004088

(51) Int. Cl.
*F02F 11/00* (2006.01)
(52) U.S. Cl. .................. 277/594; 277/593; 277/595
(58) Field of Classification Search ......... 277/593–597
See application file for complete search history.

(56) References Cited

U.S. PATENT DOCUMENTS

| | | | | |
|---|---|---|---|---|
| 4,815,750 A | * | 3/1989 | Yoshino | 277/595 |
| 4,998,741 A | * | 3/1991 | Udagawa | 277/595 |
| 5,170,927 A | * | 12/1992 | Udagawa et al. | 277/595 |
| 5,536,024 A | * | 7/1996 | Udagawa | 277/595 |
| 5,544,899 A | * | 8/1996 | Ueta | 277/595 |
| 5,609,345 A | * | 3/1997 | Miura et al. | 277/593 |
| 5,626,350 A | * | 5/1997 | Kubouchi et al. | 277/595 |
| 5,690,342 A | * | 11/1997 | Takada et al. | 277/594 |
| 5,690,343 A | * | 11/1997 | Takada et al. | 277/595 |
| 6,328,314 B1 | * | 12/2001 | Jinno et al. | 277/593 |
| 6,676,133 B1 | * | 1/2004 | Obermaier et al. | 277/593 |

FOREIGN PATENT DOCUMENTS

EP    0 579 353    1/1994

OTHER PUBLICATIONS

Patent Abstracts of Japan, vol. 2000, No. 15, Apr. 6, 2001 & JP2000 356266, Dec. 26, 2000.

* cited by examiner

*Primary Examiner*—Alison K. Pickard
(74) *Attorney, Agent, or Firm*—Manabu Kanesaka

(57) ABSTRACT

A cylinder head gasket is provided for dealing with gas leak between cylinder bores of an engine with a reduced size and rigidity. A cylinder head gasket is formed of one or more metal plates. One metal plate is provided with a first bead, a second bead, and a third bead arranged from inside in this order around a cylinder bore. The first bead is formed around each of the cylinder bores. The second beads are combined into a single bead having a width greater than a width of other section of the second beads in an area between adjacent cylinder bores. The third bead does not pass through the area between the adjacent cylinder bores and surrounds all of the cylinder bores.

3 Claims, 2 Drawing Sheets

CYLINDER HEAD GASKET

BACKGROUND OF THE INVENTION AND RELATED ART STATEMENT

The present invention relates to a cylinder head gasket placed between two members such as a cylinder head and a cylinder block of an internal combustion engine.

When a joint surface between a cylinder head and a cylinder block (cylinder body) of an automobile engine is sealed, a metal cylinder head gasket is placed between the cylinder head and the cylinder block to seal combustion gas, coolant water, and lubrication oil.

Such a cylinder head gasket has been changed from a lamenting type having many layers of metal plates to a simple structured cylinder gasket type composed of one or two metal plates for reducing a weight and production cost of an engine. Since only one or two structural plates are used, usable materials are limited for reducing a weight of an engine. A type and the number of sealing methods are limited, so that it is necessary to use a relatively simple sealing method.

As a weight and size of an engine have been reduced recently, the engine tends to have lower rigidity. Accordingly, it is difficult to obtain an even surface pressure around a cylinder bore for sealing a cylinder head. That is, because of a structural problem around a cylinder bore, when the gasket is tightened, it is difficult to generate an enough sealing surface pressure at a low rigid portion, thereby causing gas leak at the portion.

When an engine has a smaller size in a longitudinal direction to reduce a size thereof, a space between the cylinder bores decreases, thereby increasing a temperature of the cylinder bores. As a result, the cylinder head and the cylinder block are deformed, thereby increasing a chance in which gas leaks between the cylinder bores. When a small amount of gas leaks and enters a water hole or oil hole, gas enters liquid such as water and oil, thereby causing a problem in circulating water and oil and cooling the engine. Since this causes a problem for the engine, it is necessary to provide a counter measure.

A metal gasket wherein beads are formed around cylinder bores (combustion room holes) has been proposed. The beads are connected or cross between the cylinder bores, and have straight portions between the cylinder bores. An edge of the bead at a side of the cylinder bore is formed in a curved shape smoothly connecting the straight portion between the cylinder bores and arc portions around the cylinder bores except the straight portions (see Patent Reference No. 1).

With this structure, a decrease in the surface pressure at the bead crossing section is prevented for a small cylinder bore for a small engine. Also, a portion in which rigidity of the bead changes greatly around the bead crossing section is eliminated, thereby preventing gas leak at the bead crossing section.

However, in such a single bead structure, it may not be an enough solution for an increased temperature of the cylinder bore and lower rigidity of a recent engine.

Patent Reference; Japanese Patent Publication (Kokai) No. 2000-356266

In view of the problems described above, an object of the present invention is to prove a cylinder head gasket for effectively preventing gas leak between cylinder bores of an engine with a small size and low rigidity.

Further objects and advantages of the invention will be apparent from the following description of the invention.

SUMMARY OF THE INVENTION

In order to attain the objects described above, according to the present invention, a cylinder head gasket is formed of one or several metal plates. One of the metal plates is provided with a first bead, a second bead, and a third bead around a cylinder bore in this order from inside. The first bead is formed around each cylinder bore. The second beads are combined into one bead with a width greater than that of the second beads in an area between adjacent cylinder bores. The third bead is formed to surround all of the cylinder bores without passing through the area between the adjacent cylinder bores.

In the cylinder head gasket, the third bead may have a bead width greater than those of the first bead and second bead.

In the present invention, a seal line around the cylinder bore is formed of two primary beads, i.e., the first and second bead, and a supplement bead, i.e., the third bead, with a wide width for generating a relatively low surface pressure. The primary beads are arranged inside relative to the cylinder bore, and the supplement bead is placed outside the primary beads. Accordingly, three seal beads are arranged around the cylinder bore.

Since the area between the cylinder bores is small, it is difficult to arrange the three beads. Accordingly, the second beads of the primary beads are combined into one bead with a wide width arranged at the center of the adjacent first beads, and the third bead does not pass through the area.

In an area except the area between the cylinder bores, the two primary beads, i.e., the first and second beads, are arranged, and the third bead with a wide width is arranged outside the primary beads. The third bead is connected around each cylinder bore, and one bead surrounds all of the cylinder bores.

According to the present invention, it is possible to obtain the following effects.

In the area between the cylinder bores, the first bead for generating a relatively high seal surface pressure and the adjacent second beads are combined to form the bead having a wide width for generating a relatively low seal surface pressure. Accordingly, it is possible to improve pressure resistance of the first bead. It is also possible to improve compatibility with the bead having a wide width when the cylinder head is lifted due to an explosion inside the cylinder bore, thereby sealing with a proper seal surface pressure.

In the area except the area between the cylinder bores, the first bead, the two second beads, and the third bead surrounding all of the cylinder bores outside the second beads are arranged. Accordingly, it is possible to generate a high seal surface pressure with the first and second beads, thereby improving the pressure resistance. It is also possible to prevent gas leak with the third bead when gas leaks through the first and second beads.

Further, the third bead has a wide width, thereby making it possible to control not to generate a too high seal surface pressure. Accordingly, it is possible to improve compatibility with the bead having a wide width when the cylinder head is lifted due to an explosion inside the cylinder bore, thereby improving seal performance.

DETAILED DESCRIPTION OF PREFERRED EMBODIMENTS

Hereunder, a cylinder head gasket according to embodiments of the present invention will be described in detail with reference to the attached drawings.

Figure 1:
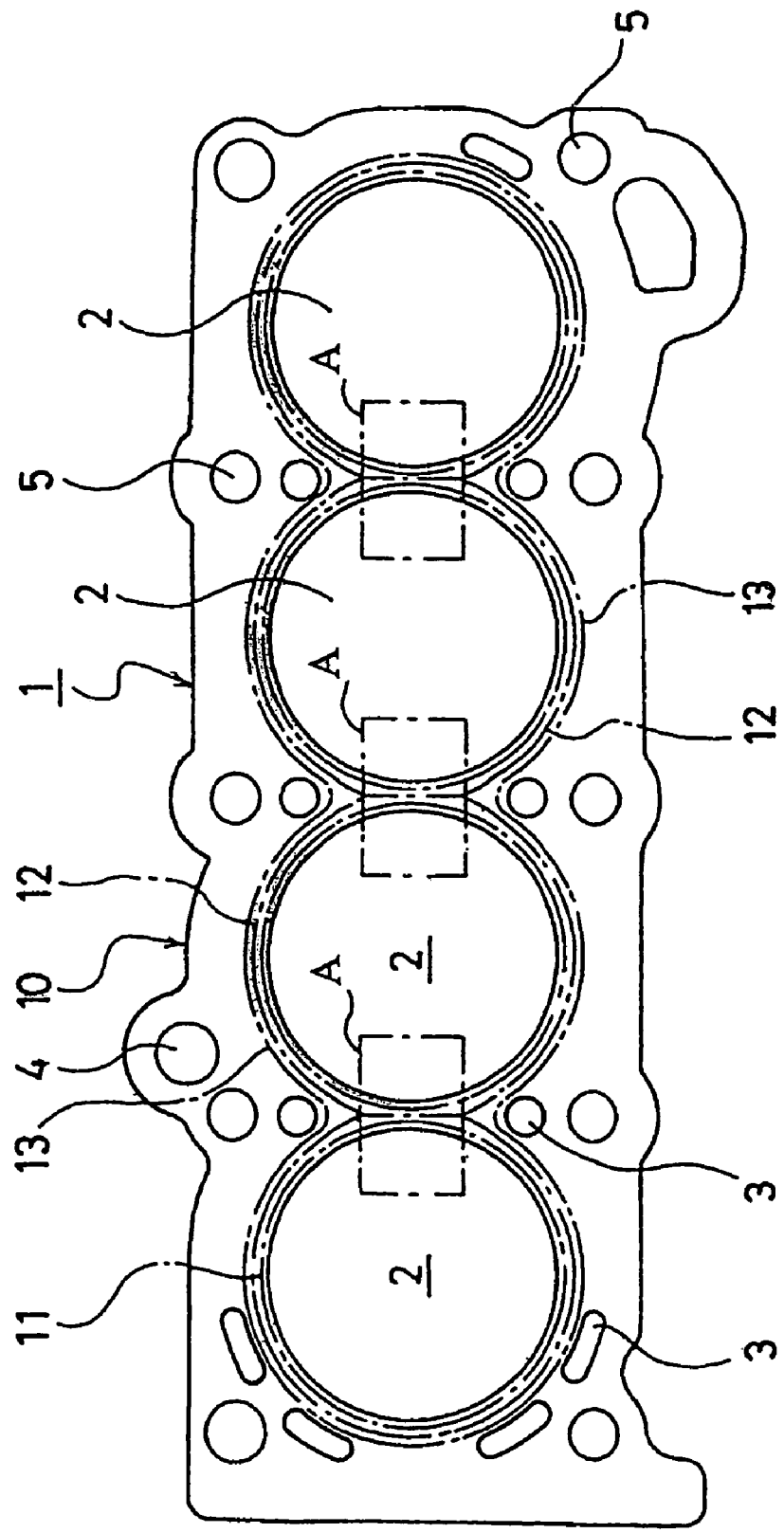
FIG. 1 is a plan view of a cylinder head gasket according to an embodiment of the present invention.

As shown in FIG. 1, a cylinder head gasket 1 is a metal gasket placed between a cylinder head and a cylinder block (cylinder body) for sealing combustion gas with a high pressure and high temperature and fluid such as coolant water and oil in a coolant passage and cooling oil passage.

Figure 2:
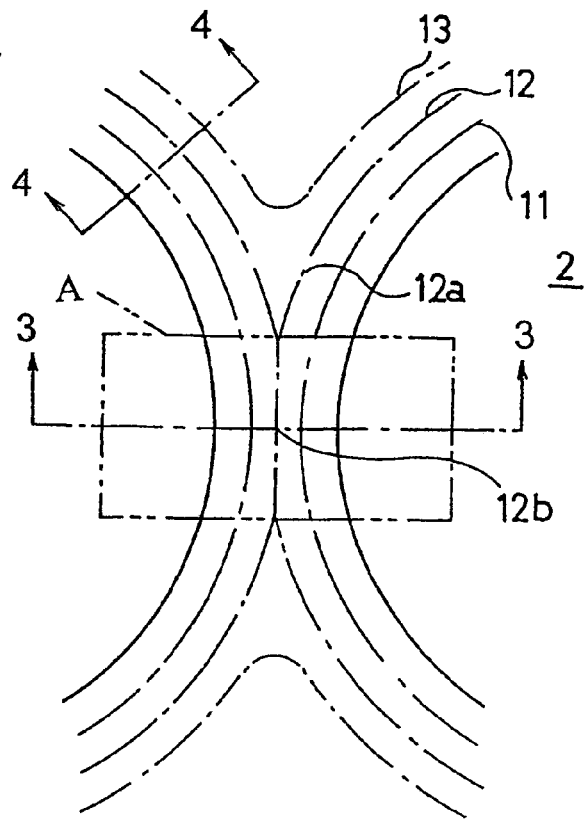
FIG. 2 is an enlarged view of an area 2 shown in FIG. 1.
Figure 3:
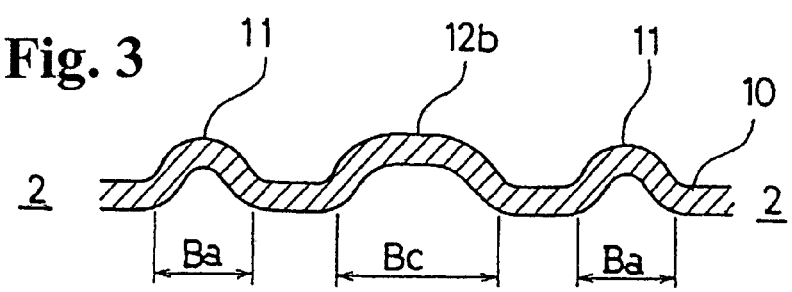
FIG. 3 is a cross sectional view taken along line 3—3 in FIG. 2.
Figure 4:
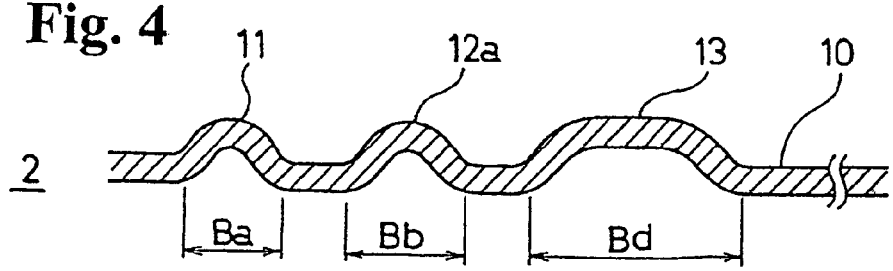
FIG. 4 is a cross sectional view taken along line 4—4 in FIG. 2.

FIGS. 2 to 4 are schematic explanatory views in which a thickness of the cylinder head gasket 1, and a size and an aspect ratio of beads and a seal surface supporting plate are different from actual ones, so that a sealing portion is enlarged for the sake of explanation.

As shown in FIGS. 1 to 4, the cylinder head gasket 1 of the present invention is formed of a sheet of a metal plate 10 made of annealed stainless material (annealed material), stainless material (spring steel), or soft steel. The metal plate 10 is formed in a shape corresponding to a shape of an engine part such as a cylinder block, and is provided with cylinder bores 2, coolant water holes 3, oil holes 4 for circulating oil, and bolt holes 5 for tightening bolts.

First beads 11, second beads 12, and a third bead 13 all formed of full beads are arranged around the cylinder bores 2 as sealing means, thereby forming triple sealing lines.

The first bead 11 surrounds each of the cylinder bores 2. The first beads 11 have a narrow width Ba for generating a relatively high seal surface pressure, thereby improving pressure resistance.

The second beads 12 are arranged on an outer circumference side of the first beads 11, and are combined into one bead 12b in an area A between the adjacent cylinder bores 2, thereby having a bead width Bc greater than a bead width Bb of the second bead 12. In the area A, the second beads 12 are combined to be the wide bead 12b for decreasing the seal surface pressure, thereby improving compatibility when the cylinder head is lifted due to an explosion inside the cylinder bore. In an area other than the area A, similar to the first beads 11, the second beads 12a have the narrow bead width Bb for generating a relatively high seal surface pressure.

The third bead 13 is arranged outside the second beads 12, and surrounds all of the cylinder bores 2 without passing through the area A between the adjacent cylinder bores 2. It is arranged such that the water holes 3, the oil holes 4, and the bolt holes 5 are not situated inside the third bead 13. Accordingly, if gas from the cylinder bores 2 leaks through the first beads 11 and the second beads 12, it is possible to prevent gas from leaking outside the triple seal lines and entering the water holes 3 and the oil holes 4.

As shown in FIG. 4, the third bead 13 has a bead width Bd greater than the bead width Ba and the bead width Bb of the first beads 11 and the second beads 12. Accordingly, it is possible to control a generated seal surface pressure to be not too high, and improve compatibility when the cylinder head is lifted due to an explosion inside the cylinder bore.

In the embodiment, the first beads 11, the second beads 12, and the third bead 13 around the cylinder bores 2 are formed of the full beads. The third bead may be formed of a half bead when it is sufficient to generate a relatively low seal surface pressure.

A relationship between heights of the first beads 11 and the second beads 12 in the area A between the cylinder bores 2 is selected according to a required distribution of the seal surface pressure. When the first beads 11 have a height greater than that of the second beads 12, the surface pressure of the inside seal line becomes hider than the surface pressure of the outside seal line. When the first beads 11 have a height smaller than that of the second beads 12, the surface pressure of the inside seal line becomes lower than the surface pressure of the outside seal line.

A relationship among heights of the third bead 13, the first beads 11 and the second beads 12 is also selected according to a required distribution of the seal surface pressure. By adjusting a height of the third bead 13, it is possible to adjust the surface pressure of the third seal line relative to the seal pressures of the second beads 12 and the first beads 11, thereby obtaining a favorable distribution of the seal surface pressure according to an engine.

In the embodiment, the cylinder head gasket is formed of one sheet of the metal plate 10. According to the present invention, the cylinder head gasket may be formed of more than two metal plates. In this case, one of the metal plates has a structure same as that of the metal plate 10, and another metal plate is laminated on the metal plate 10.

The disclosure of Japanese Patent Application No. 2004-004088, filed on Jan. 9, 2004, is incorporated in the application.

While the invention has been explained with reference to the specific embodiments of the invention, the explanation is illustrative and the invention is limited only by the appended claims.

What is claimed is:

1. A cylinder head gasket comprising:
at least one metal plate having a plurality of cylinder bores and at least one area between two adjacent cylinder bores,
first beads formed in the metal plate to surround the respective cylinder bores, independently,
second beads formed in the metal plate to completely surround the respective cylinder bores outside the first bead, said second beads being combined into a single section in the at least one area between the two adjacent cylinder bores, said single section having a width greater than that of a section other than the single section of the second bead, and
a third bead formed in the metal plate around all of the cylinder bores outside the second bead, said third bead extending outside the area between the adjacent cylinder bores,
wherein said third bead has a width greater than those of the first bead and the second bead.

2. A cylinder head gasket according to claim 1, wherein said third bead surrounds only the cylinder bores without surrounding bolt, water and oil holes.

3. A cylinder head gasket according to claim 2, wherein said first, second and third beads are full beads.

* * * * *